United States Patent
Fang et al.

(10) Patent No.: US 12,094,101 B2
(45) Date of Patent: *Sep. 17, 2024

(54) INSPECTION OF RETICLES USING MACHINE LEARNING

(71) Applicant: KLA-Tencor Corporation, Milpitas, CA (US)

(72) Inventors: Hawren Fang, San Jose, CA (US); Abdurrahman Sezginer, Monte Serano, CA (US); Rui-fang Shi, Cupertino, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 17/456,415

(22) Filed: Nov. 24, 2021

(65) Prior Publication Data
US 2022/0084179 A1 Mar. 17, 2022

Related U.S. Application Data

(63) Continuation of application No. 16/201,788, filed on Nov. 27, 2018, now Pat. No. 11,257,207.
(Continued)

(51) Int. Cl.
*G06T 7/00* (2017.01)
(52) U.S. Cl.
CPC .... *G06T 7/001* (2013.01); *G06T 2207/20081* (2013.01); *G06T 2207/20084* (2013.01); *G06T 2207/30148* (2013.01)
(58) Field of Classification Search
CPC .......... G06T 7/001; G06T 2207/20081; G06T 2207/20084; G06T 2207/30148;
(Continued)

(56) References Cited

U.S. PATENT DOCUMENTS 5,650,854 A * 7/1997 Sugawara ................. G03F 1/84
356/394
6,466,315 B1 10/2002 Karpol et al.
(Continued)

FOREIGN PATENT DOCUMENTS

| JP | 2017523444 A | 8/2017 |
|---|---|---|
| TW | 201602717 A | 1/2016 |
| TW | 201721284 A | 6/2017 |

OTHER PUBLICATIONS

U.S. Appl. No. 16/201,788, Non-Final Rejection, Jun. 10, 2020, 14 pgs.
(Continued)

*Primary Examiner* — Roy M Punnoose
(74) *Attorney, Agent, or Firm* — Kwan & Olynick LLP (57) ABSTRACT

Disclosed are methods and apparatus for inspecting a photolithographic reticle. A plurality of reference far field images are simulated by inputting a plurality of reference near field images into a physics-based model, and the plurality of reference near field images are generated by a trained deep learning model from a test portion of the design database that was used to fabricate a test area of a test reticle. The test area of a test reticle, which was fabricated from the design database, is inspected for defects via a die-to-database process that includes comparing the plurality of reference far field reticle images simulated by the physic-based model to a plurality of test images acquired by the inspection system from the test area of the test reticle.

19 Claims, 7 Drawing Sheets

Related U.S. Application Data (60) Provisional application No. 62/611,321, filed on Dec. 28, 2017.

(58) Field of Classification Search
CPC ............... G06T 7/0004; G01N 21/956; G01N 2021/95676; G03F 1/84
See application file for complete search history.

(56) References Cited

U.S. PATENT DOCUMENTS

| | | | |
|---|---|---|---|
| 7,353,114 | B1 | 4/2008 | Rohlf et al. |
| 11,257,207 | B2 | 2/2022 | Fang et al. |
| 2013/0080984 | A1* | 3/2013 | Liu .................. G06F 30/398 716/112 |
| 2016/0267060 | A1 | 9/2016 | Skirpa et al. |
| 2017/0148226 | A1 | 5/2017 | Zhang et al. |
| 2017/0191948 | A1* | 7/2017 | Gao ................. G01N 21/95607 |
| 2017/0193680 | A1 | 7/2017 | Zhang et al. |
| 2017/0221190 | A1 | 8/2017 | Sezginer et al. |
| 2017/0346140 | A1 | 11/2017 | Koebler |
| 2018/0082415 | A1* | 3/2018 | Sezginer ................. G06T 7/001 |
| 2019/0206041 | A1 | 7/2019 | Fang et al. |

OTHER PUBLICATIONS

U.S. Appl. No. 16/201,788, Final Rejection, Dec. 3, 2020, 23 pgs.
U.S. Appl. No. 16/201,788, Notice of Allowance mailed Aug. 23, 2021, 18 pgs.
Chao Dong, Chen Change Loy, Kaiming He, Xiaoou Tang, "Learning a Deep Convolutional Network for Image Super-Resolution," in Proc. of European Conference on Computer Vision (ECCV), 2014.
European Search Report and Written Opinion for Application EP18896323, dated Jul. 16, 2021, 8 pages.
Hector Garcia, William Volk, Sterling Watson, Carl Hess, Chris Aquino, Jim Wiley, Chris Mack, New Die to Database Inspection Algorithm for Inspection of 90-nm Node Reticles, Published 2003, SPIE vol. 5130. 11 pages.
International Search Report PCT/US2018/065582, search completed Apr. 26, 2019, mailed May 1, 2019. 3 pages.
Jianchao Yang, John Wright, Yi Ma, Thomas Huang, Image Super-Resolution as Sparse Representation of Raw Image Patches, University of Illinois at Urbana-Champagin, Beckman Institute and Coordinated Science Laboratory, 8 Pages.
Jiwon Kim, Jung Kwon Lee and Kyoung Mu Lee, "Accurate Image Super-Resolution Using Very Deep Convolutional Networks", Proc. of IEEE Conference on Computer Vision and Pattern Recognition (CVPR), 2016.
Pingfan Song, Joao F. C. Mota, Nikos Deligiannis, Miguel R. D. Rodriques, Coupled Dictionary Learning For Multimodal Image Super-Resolution, Dept. of Electronics and Electrical Engineering, University College London, UK and Department of Electronics and Informatics, Vrije Universiteit Brussel, Belgium iMinds vzw, Ghent Belgium. 15 Pgs.
Written Opinion PCT/US2018/065582, Mailed May 1, 2019. 6 pages.
Japanese Office Action, Patent Application No. 2020-536167, mailed Dec. 9, 2022, 10 pages.
ROC (Taiwan) Office Action, Patent Application No. 107146330, mailed Jan. 5, 2023, 18 pages.
1 Office Action for TW112137763, dated Feb. 27, 2024, 14 pgs.

\* cited by examiner

INSPECTION OF RETICLES USING MACHINE LEARNING

CROSS-REFERENCE TO RELATED APPLICATIONS

This application is a continuation and claims priority to U.S. patent application Ser. No. 16/201,788, filed on Nov. 27, 2018, titled "Inspection of Reticles Using Machine Learning" by Hawren Fang et al., which claims priority of U.S. Provisional Application No. 62/611,321, filed 28 Dec. 2017, titled "Inspection of Reticles Using Machine Learning" by Hawren Fang et al. These applications are incorporated herein by reference in their entirety for all purposes.

TECHNICAL FIELD OF THE INVENTION

The invention generally relates to the field of semiconductor inspection, such as reticle inspection. More particularly the present invention relates to die-to-database inspections and the like.

BACKGROUND

Generally, the industry of semiconductor manufacturing involves highly complex techniques for fabricating integrated circuits using semiconductor materials which are layered and patterned onto a substrate, such as silicon. An integrated circuit is typically fabricated from a plurality of reticles. Initially, circuit designers provide circuit pattern data or a design database, which describes a particular integrated circuit (IC) design, to a reticle production system, or reticle writer. The circuit pattern data is typically in the form of a representational layout of the physical layers of the fabricated IC device. The representational layout includes a representational layer for each physical layer of the IC device (e.g., gate oxide, polysilicon, metallization, etc.), wherein each representational layer is composed of a plurality of polygons that define a layer's patterning of the particular IC device. The reticle writer uses the circuit pattern data to write (e.g., typically, an electron beam writer or laser scanner is used to expose a reticle pattern) a plurality of reticles that will later be used to fabricate the particular IC design.

Each reticle or photomask is generally an optical element containing at least transparent and opaque regions, and sometimes semi-transparent and phase shifting regions, which together define the pattern of coplanar features in an electronic device such as an integrated circuit. Reticles are used during photolithography to define specified regions of a semiconductor wafer for etching, ion implantation, or other fabrication processes.

A reticle inspection system may inspect the reticle for defects that may have occurred during the production of the reticles or after use of such reticles in photolithography. Due to the large scale of circuit integration and the decreasing size of semiconductor devices, the fabricated devices have become increasingly sensitive to defects. That is, defects which cause faults in the device are becoming smaller. Accordingly, there is a continuing need for improved inspection techniques for monitoring characteristics of the reticle.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, methods and apparatus for inspecting a photolithographic reticle are disclosed. A plurality of reference far field images are simulated by inputting a plurality of reference near field images into a physics-based model, and the plurality of reference near field images are generated by a trained deep learning model from a test portion of the design database that was used to fabricate a test area of a test reticle. The test area of a test reticle, which was fabricated from the design database, is inspected for defects via a die-to-database process that includes comparing the plurality of reference far field reticle images simulated by the physic-based model to a plurality of test images acquired by the inspection system from the test area of the test reticle.

In one aspect, the deep learning model was trained by (i) inputting a plurality of reticle database images produced from a training portion of a design database into the deep learning model to generate a plurality of near field reticle images, (ii) receiving the plurality of near field images into the physics-based model to simulate a plurality of corresponding far field reticle images at an image plane of an inspection system via the physics-based process, (iii) providing a plurality of corresponding training reticle images that were acquired by imaging a portion of a training reticle fabricated from the training portion of the design database and such training reticle images are selected for pattern variety and are defect-free, (iv) training the deep learning model by adjusting a plurality of parameters of the deep learning model and repeating the operation of inputting the plurality of reticle database images into the deep learning model with its adjusted parameters to generate a plurality of adjusted near field images that are received by the physics-based model to simulate a next plurality of far field images until differences between the next far field reticle images and the plurality of corresponding training reticle images are minimized.

In another aspect, the physic-based process is based on the Hopkins method for producing the far field reticle image on an image plane of the inspection tool based on the near field reticle image, and the deep learning model was trained as a convolutional neural network (CNN) that does not incorporate reticle image formation onto the image plane and includes mapping each reticle database image to a near field image that would be generated by light interacting with a reticle that was fabricated with the design database. In a further aspect, the CNN excludes simulating perturbations in the far field reticle image caused by field-dependent changes in the inspection tool and is independent of the inspection tool. In another aspect, the deep learning model was trained by adjusting certain parameters, including weights and/or bias values, of a plurality of layers of the deep learning model so as to minimize differences between the far field reticle images and the corresponding training reticle images. In one embodiment, the layers, in which adjusting occurs, comprise convolutional layers with nonlinear activations. In a further aspect, the deep learning model was trained without adjusting parameters in one or more low pass filtering layers for down sampling operations.

In an alternative embodiment, the CNN includes one or more convolutional layers for counterbalancing deviations between the reticle database image and a physical reticle produced by such reticle database image, one or more layers for producing a plurality of down sampled images, and one or more layers for implementing a sparse representation for near field resolution. In another implementation, the test images are aligned with the reference images, and a dynamic compensation process is applied to the reference images with respect to the test images to counterbalance variations, including focus fluctuations and/or field dependent variations, in the inspection tool.

In an alternative embodiment, the invention pertains to an inspection system for inspecting a photolithographic reticle. The system comprising at least one memory and at least one processor that are configured to perform one or more of the above-described operations. In another aspect, the invention pertains to a computer readable medium having instruction stored thereon for performing one or more of the above-described operations.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Inspection techniques described herein may be applied with respect to any suitable type of reticle or photomask. In one example, an extreme ultraviolet (EUV) lithography process uses an EUV type reticle that is designed to facilitate patterning on a wafer at EUV wavelengths, such as 13.5 nm. An EUV reticle may generally include a substrate, such a low thermal expansion (LTE) or ultra-low expansion (ULE) glass plate, such as fused silica. The substrate is covered with multiple layers of materials to provide moderate reflectance (e.g., 60-70% or more) at the EUV wavelength for performing lithographic exposure at EUV wavelengths. The multilayer (ML) stack serves as a Bragg reflector that maximizes the reflection of EUV radiation while being a poor absorber of the EUV radiation. Reflection generally occurs at interfaces between materials of different indices of refraction with higher differences causing more reflectivity. Although indices of refraction for materials exposed to wavelengths that are extremely low are about equal to 1, significant reflection can be achieved through use of multiple layers having alternating layers of different refractive indices. The ML stack comprises low absorption characteristics so that the impinging radiation is reflected with little loss. In certain embodiments, the multiple layers include between about 30 to 40 (or 40 to 50) alternating pairs of molybdenum (Mo) and silicon (Si) layers arranged with about 7 nanometer pitch. Other suitable layers may include alternating layers of $Mo_2C$ and Si, Mo and beryllium (Be), molybdenum ruthenium (MoRu) and Be.

The multiple layers may include a capping layer, such as Ru, to prevent oxidation. In other embodiments, an EUV reticle may include a quartz, antireflective coating (ARC), and other features. A pattern is formed in an absorber layer that is disposed over the multiple layers. For example, a tantalum boron nitride (TaBN) film topped by a thin antireflective oxide, such as tantalum boron oxide (TaBO), acts as an EUV absorber. The material(s) used for the reticle pattern may be selected to have nearly zero etch bias so as to achieve ultra-fine resolution features.

Besides an EUV type reticle, the terms "reticle" and "photomask" may also include a transparent substrate, such as glass, borosilicate glass, quartz, or fused silica having a layer of opaque material formed thereon. The opaque (or substantially opaque) material may include any suitable material that completely or partially blocks photolithographic light (e.g., deep UV). Example materials include chrome, molybdenum silicide (MoSi), tantalum silicide, tungsten silicide, opaque MoSi on glass (OMOG), etc. A polysilicon film may also be added between the opaque layer and transparent substrate to improve adhesion. A low reflective film, such as molybdenum oxide ($MoO_2$), tungsten oxide ($WO_2$), titanium oxide ($TiO_2$), or chromium oxide ($CrO_2$) may be formed over the opaque material.

The term reticle may refer to different types of reticles including, but not limited to, a clear-field reticle, a dark-field reticle, a binary reticle, a phase-shift mask (PSM), an alternating PSM, an attenuated or halftone PSM, a ternary attenuated PSM, and a chromeless phase lithography PSM. A clear-field reticle has field or background areas that are transparent, and a dark-field reticle has field or background areas that are opaque. A binary reticle is a reticle having patterned areas that are either transparent or opaque. For example, a photomask made from a transparent fused silica blank with a pattern defined by a chrome metal adsorbing film can be used. Binary reticles are different from phase-shift masks (PSM), one type of which may include films that only partially transmit light, and these reticles may be commonly referred to as halftone or embedded phase-shift masks (EPSMs). If a phase-shifting material is placed on alternating clear spaces of a reticle, the reticle is referred to as an alternating PSM, an ALT PSM, or a Levenson PSM. One type of phase-shifting material that is applied to arbitrary layout patterns is referred to as an attenuated or halftone PSM, which may be fabricated by replacing the opaque material with a partially transmissive or "halftone" film. A ternary attenuated PSM is an attenuated PSM that includes completely opaque features as well.

Referring back to the EUV photolithography process, the light source may produce any suitable radiation that is suitable for use with EUV reticles. For instance, EUV wavelengths between about 11 to 14 nm or lower soft x-ray wavelengths may be utilized. In a specific implementation, a wavelength of about 13.5 nm is produced. During photolithography, radiation that is reflected from the multiple layers of an EUV reticle is absorbed in a resist layer formed on a wafer substrate. The absorbed radiation produces photoacids (H+) and amplified photoacids that form an exposed pattern in the resist layer of the wafer substrate that corresponds to the absorber pattern layer of the EUV reticle when the photo resist is developed.

The defectivity control of the EUV photomasks, which defines the patterns printed on silicon wafers, plays a critical role from a process yield management perspective. However, defect detection has been regarded as one of the high risk areas of EUV lithography development due to the lack of an actinic EUV photomask inspector that optically inspects the photomask at the same wavelength as the EUV scanner uses (e.g., 13.5 nm). Electron-beam inspection tools, which potentially can offer a good sensitivity, typically have an inspection throughput that is orders of magnitude slower than what is desired and is, therefore, not a practical solution for full mask inspection. Currently, and for the foreseeable future, the inspection of patterned EUV photomasks has to rely on the more available, higher throughput inspection tools operating within the deep-UV (DUV) wavelength range (190-260 nm).

One type of inspection technique utilizes a die-to-database approach, which typically includes calculating a reference image based on the database. The database contains a list of polygonal shapes to be written on the reticle. Calculating the reference image may typically include (i) modeling electron-beam lithography by which the polygons are written on the reticle, (ii) characterizing the pupil illumination pattern of the reticle inspection microscope, (iii) calculating how the illumination interacts with the patterned reticle, forming a diffracted near field, and (iv) modeling how the diffracted near field is imaged and recorded by an array sensor at the image plane.

Calculating how the illumination interacts with the patterned reticle, forming a diffracted near field, is computationally difficult when using a physics-based approach such as the Hopkins method. Generally, the Hopkins method is based on the exchange of the integration order over the point source contributions and the diffraction amplitudes, which allows a given optical system with fixed illumination, numerical aperture, defocus, and other aberrations to be described with the transmission cross coefficients (TCCs). The TCCs may be calculated just once and thereafter reused for repeated image simulations of different mask patterns imaged by the same optical system. One issue is that using the Hopkins method for an extreme ultra-violet (EUV) reticle is computationally prohibitively expensive. For instance, there is no known method to solve rigorously for the entire reticle within a practical inspection time. Another difficulty in calculating how the illumination interacts with the patterned reticle is that there is some uncertainty in the dimensions of the reticle pattern, the profile of the sidewalls of the etched pattern, and the optical properties of reticle materials.

Certain embodiments of the present invention use machine learning to map the pattern on the mask to the diffracted field. In a specific implementation, a convolutional neural network (CNN) is used to learn this mapping of the mask pattern to the diffracted field, referred to as the "mask near field." Although the following example embodiments are mainly described in the context of a CNN, other machine learning or neural network processes can be utilized to learn the mask near field image.

Except for the interaction of illumination with the reticle, image formation can be accurately characterized and rapidly simulated using a physics-based model.

Accordingly, the approach for generating a reference image for the reticle retains the physics-based model process. That is, the learning process, e.g., via CNN, does not incorporate reticle image formation onto the image plane, e.g., the inspection tool detector.

In one embodiment, a convolutional neural network is trained using actual reticles and their actual images acquired by the inspection tool. In this mode of operation, the training is performed by minimizing the difference between the simulated final image on the detector and the actual image acquired by the tool.

Properties of the optical system can vary temporally and with different positions in the imaging field. Advantageously, once the field diffracted by the reticle is known from the CNN process, perturbations in the image with respect to changes in the optical system can be computed using a physics-based model. Accordingly, the CNN is not burdened with this task so that the training process is significantly simplified as compared to if the detector image would be learned by the CNN. A neural network process provides a significantly more accurate calculation of the near field reticle image as compared with a physics-based approach. Additionally, the neural network process is efficient since the input and output images for the neural network are not significantly different from each other and the learning task is simplified. This efficiency is accomplished by not having the neural network process learn the far field image. In sum, combining an accurate neural network approach for calculating a near field reticle image with a physics-based approach for calculating the reticle image from the near field reticle image results in a more efficient and sensitive inspection process.

Figure 1:
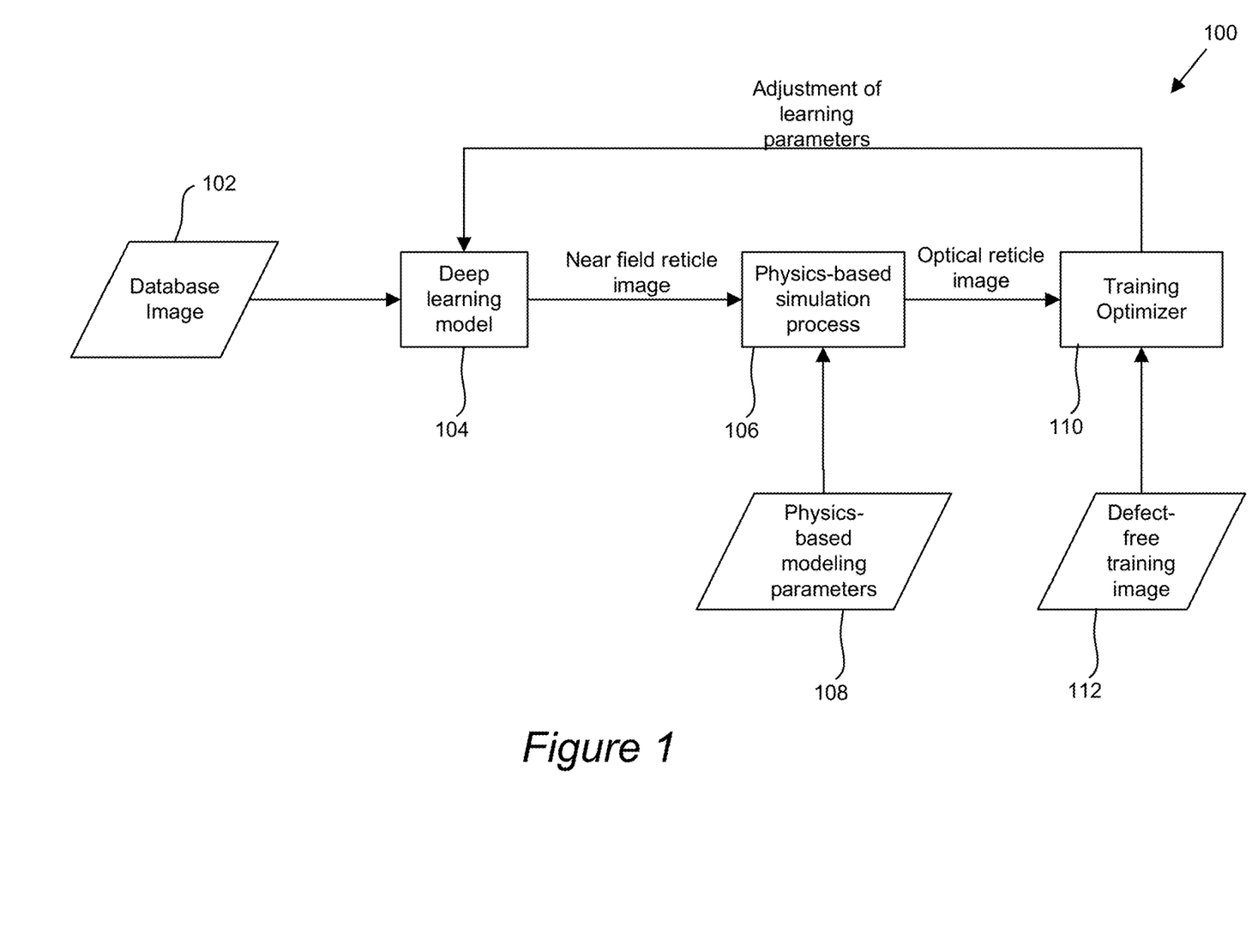
FIG. 1 is a diagrammatic representation of a process for obtaining reference reticle images from a design database in accordance with one embodiment of the present invention.

FIG. 1 is a diagrammatic representation of a process 100 for obtaining reference reticle images from a design database in accordance with one embodiment of the present invention. Initially, a database image 102 is provided to a deep learning model 104. The database image may be provided based on the design database that was used to fabricate the reticle that is to be inspected. For example, a binary reticle image is rendered from the polygon descriptions of the design database using any suitable techniques. That is, dark and light intensity values may be assigned to the absorber and multilayer areas, respectively or vice versa.

The deep learning model 104 is configured to generate a near field reticle image via a learning model into which the database reticle image 102 is input. During the training, a near field reticle image is output by the deep learning model 104 and input to a physics-based simulation process 106 based on physics-based modeling parameters 108. For instance, the physics-based approach involves the Hopkins method for simulating the light from the reticle near field image passing through the inspection tool's collection path to a far field image on the detector of such tool. The physics-based modeling parameters can include pre-calculating transmission cross coefficients (TCC) for the light behavior from the near field through the inspection system to the detector. The physics-based simulation process 106 outputs a simulated optical reticle image, which is input to a training optimizer 110 that optimizes the differences between the optical reticle image and a defect-free training optical image 112 acquired by imaging a reticle fabricated from the design database.

In one embodiment, a small area of a reticle (e.g., less than 0.01%) is checked and verified as defect-free or assumed to be defect-free. Images from this defect-free portion of the reticle are acquired and used as training images. After training of the model, the rest of the reticle (e.g., other 99.99%) can be inspected using output from the trained model.

The deep learning model works in conjunction with the training optimizer 110 so as to train a thick mask diffraction model to output the near field reticle image from the database reticle image based on the defect-free training image 112. That is, the optimizer trains or adjusts the deep learning model parameters, while the physics-based modeling parameters 108 are kept constant.

Figure 2:
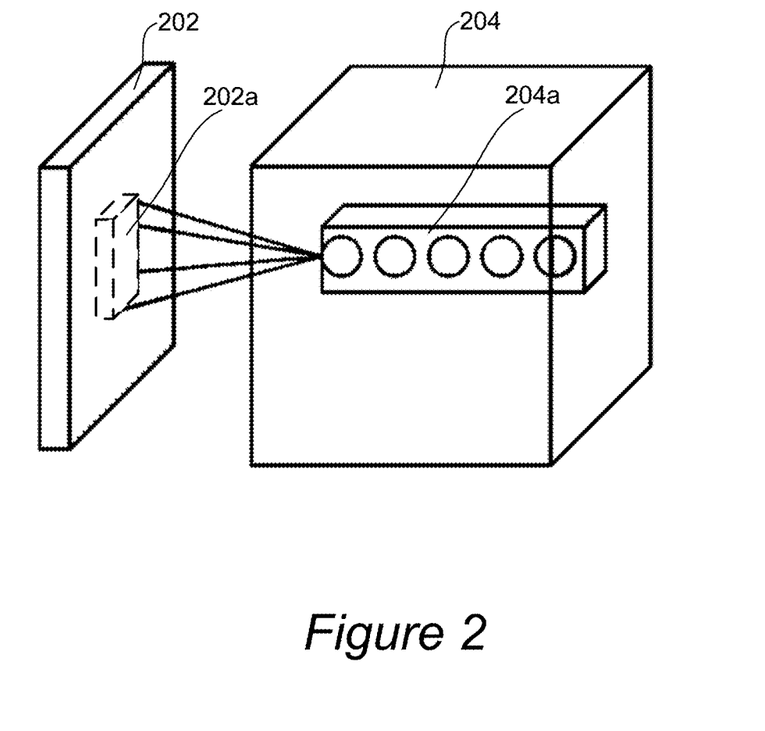
FIG. 2 illustrates a diagrammatic representation of a neuron of a convolutional layer for receiving a receptive field of the reticle database image in accordance with an example implementation of the present invention.

Any suitable deep learning model may be used for determining the reticle near field. In a specific implementation, a convolutional neural network (CNN) may be used. CNN is a class of deep, feed-forward artificial neural networks, most commonly applied to analyzing visual imagery so it's well suited for analyzing reticle database images. In general, the CNN includes multiple interconnected layers of "neurons", and each neuron is designed to mimic the visual cortex in that each neuron receives and transforms only a small input field, e.g., a small portion of the reticle database image. The input area of a neuron is called its receptive field. In a convolutional layer, the receptive area is smaller than the entire previous layer. FIG. 2 illustrates a diagrammatic representation of a convolutional layer 204 having neuron 204a for receiving a receptive field 202a of the reticle database image 202 in accordance with an example implementation of the present invention. The layer 204 will also include other neurons (not shown) for other receptive fields of the reticle database image 202.

Each neuron in a neural network applies some function to the input values from its receptive field in the previous layer and computes a set of output values. The function that is applied to the input values may be specified by a vector of weights and a bias (typically real numbers). Learning in a neural network progresses by making incremental adjustments to the biases and weights. In a convolutional layer, the vector of weights and bias may be referred to as a filter, and one distinguishing feature of convolutional layers is that many neurons may share the same filter. This sharing of filters reduces memory footprint because a single filter may be used across all receptive fields, rather than each receptive field having its own bias and vector of weights in a fully connected layer.

In neural networks, each neuron receives input from some number of locations in the previous layer. In a fully connected layer, each neuron receives input from every element of the previous layer. In a convolutional layer, neurons receive input from only a restricted subarea of the previous layer. A fully connected layer for even a small image, such as 100×100 pixels, will entail use of 10000 weights for each neuron in the receiving layer. Instead, use of a convolutional layer reduces the number of free parameters, allowing the network to be deeper with fewer parameters. For instance, tiling regions of size 5×5 can each use the same shared weights, e.g., only 25 learnable parameters.

The CNN will typically have distinct types of layers, both locally and completely connected, which are stacked to form the CNN. These stacked layers can be used to form an accuate reticle near field image from a reticle database image. Several techniques for using CNN to learn an accurate image are described further in, for example, Chao Dong et al., "Learning a Deep Convolutional Network for Image Super-Resolution," in Proc. of European Conference on Computer Vision (ECCV), 2014, which paper is incorporated herein by reference. In general, the reticle database image will be input to the CNN layers to generate a near field image, which is then used as input to a physic-based model that outputs a simulated reticle far field image (e.g., at the inspection detector).

Figure 3:
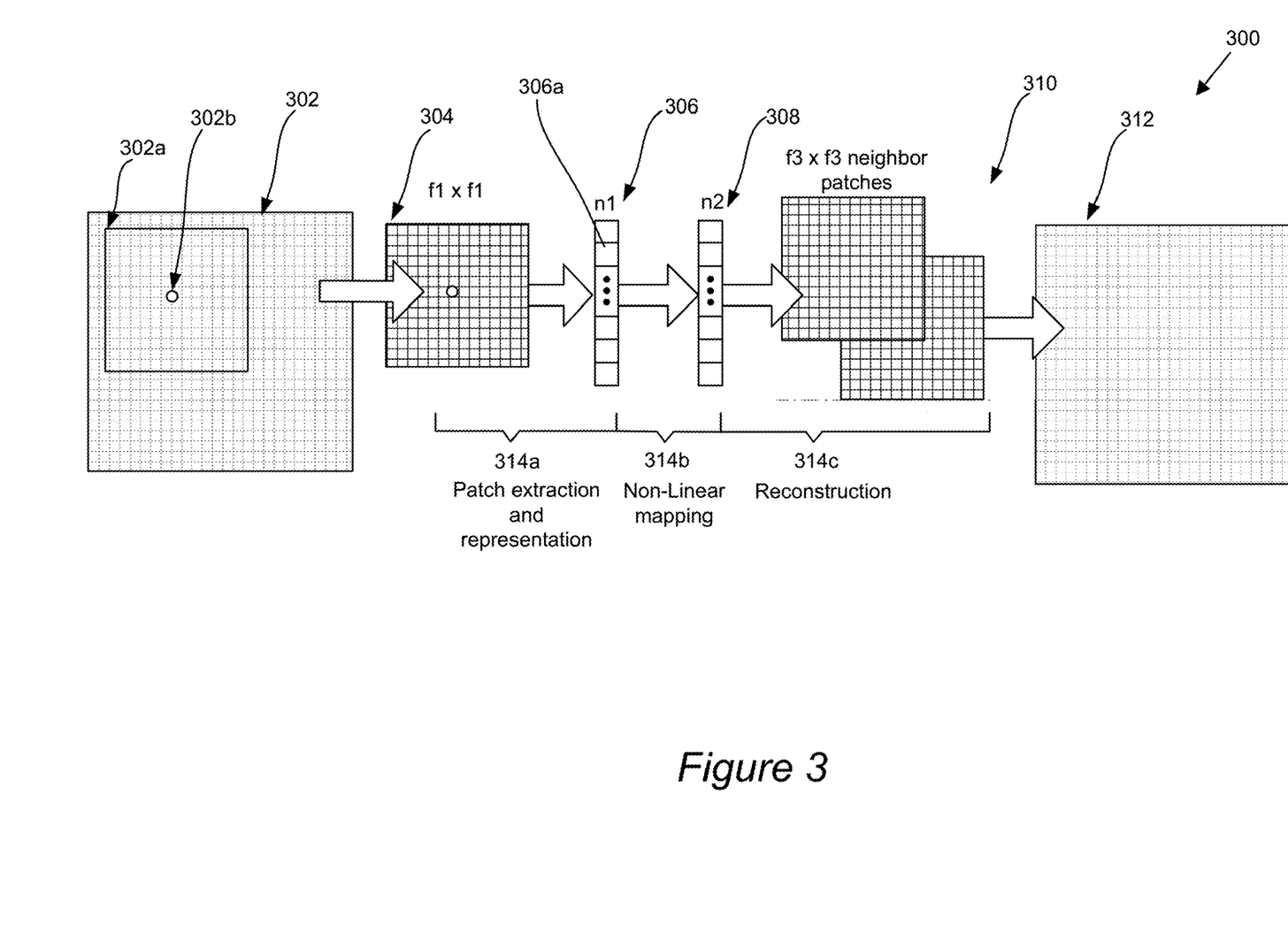
FIG. 3 illustrates a convolutional neural network (CNN) process for generating a reticle near field image from a reticle database image in accordance with one embodiment of the present invention.

FIG. 3 illustrates a simplified CNN process 300 for generating a reticle near field image 312 from a reticle database image 302 in accordance with one embodiment of the present invention. In this example, the CNN will typically include additional layers and additional filters and mappings at each layer, which are not shown in the illustration so as to simplify the description.

Initially, the reticle database image 302 may be received by a patch extraction layer 314a for extracting and representing patches from the reticle database image 302. The patches may be overlapping. For example, patch extraction layer 314a may include filter 304, which is in the form of a kernel of weights that are applied to each pixel. Each filter has a size $f_1 \times f_1$. In the illustrated example, filter 304 is a 9×9 kernel that is convolved with respect to each pixel of the reticle database image 302. That is, the 9×9 kernel is stepped across the reticle database image so as to place each pixel one at a time into the center of the kernel. In the current example, filter 304 is shown as being applied to pixel 302b and its neighbor pixels 302a of reticle database image 302. The output of filter 304 on this pixel 302b and its neighbor pixels will be a value 306a (of array 306). There will be additional filters (not shown) that are applied to each pixel, resulting in an array of n1 values (e.g., array 306) for each pixel. A dot product between each kernel filter's weights and the respective overlapping reticle database image may generally be performed to result in a value for the particular pixel. A resulting image having a same size as the reticle database image is produced from the kernel being stepped and applied across the entire reticle database image. The output arrays of all the filters of the patch extraction layer as applied to all the reticle database image pixels are not shown so as to simplify the invention.

As shown, the output from the patch extraction layer can then be input to the next layer. As shown, a non-linear mapping layer 314b may be applied to the output of the patch extraction layer 314a. As shown, the convolution results $n_1$ (306) for reticle pixel 302b may then be input to a nonlinear mapping layer that outputs mapped nonlinear results $n_2$ (308). Any suitable number and type of nonlinear mapping layer(s) may be used by the CNN. By way of examples, a sigmoid(x), a tanh(x), ReLU (rectified linear units), leaky ReLU, etc. The ReLU function applies the non-saturating activation function $f(x)=\{\max(0,x)\}$, which serves to increase the nonlinear properties of the decision function and of the overall network without affecting the receptive fields of the convolution layer.

After all the pixels of the reticle database go through the patch extraction and nonlinear mapping layers, a reconstruction process 314c may reconstruct a reticle near field image result 312 by combining the filter and nonlinear mapping results. More precisely, the reconstruction process may aggregate $f_3 \times f_3$ neighboring patches 310 for each pixel. The resulting near field image may represent ground truth near field image. However, as further described herein, additional processing is performed on the near field image using a physics-based approach to simulate the final reticle far field image, which is expected to be similar to the ground truth far field reticle image, which is readily available.

Figure 4:
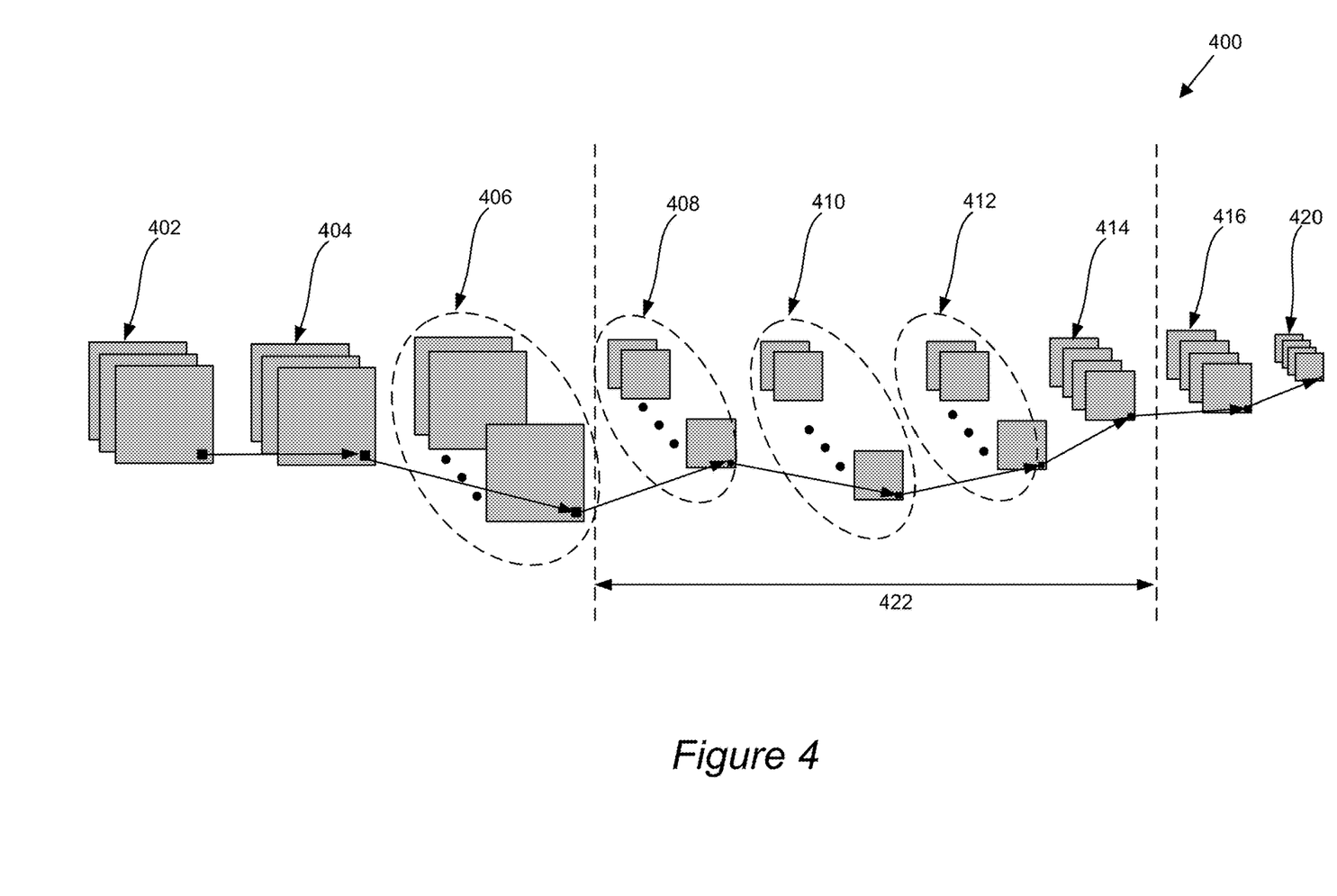
FIG. 4 illustrates a detailed CNN process for generating reticle near field images from a reticle database image in accordance with a specific implementation of the present invention.

As mentioned herein, the CNN will likely include any number and type of convolution layers and/or other layers. FIG. 4 illustrates a detailed CNN process 400 for generating reticle near field images from a reticle database image in accordance with a specific implementation of the present invention. Initially, the reticle database images may comprise multiple images 402. For example, the reticle database images 402 may include an image that is rasterized from the design database, an absolute-valued X gradient image denoted by |gradx(DB)|, and an absolute-valued Y gradient image, denoted by |grady(DB)|. In this example, "DB" is the reticle database image. The gradient image in the X direction, |gradx(DB)|, can be implemented by the finite difference approximation, which is performed by a convolution filter [−1 0 1] applied to the rows of the DB subject to scaling. The absolute value function may then be applied element-wise to form |gradx(DB)|. Likewise, the absolute-valued gradient image in the Y direction, |grady(DB)|, can be obtained.

The CNN may include one or more convolutional layers for counterbalancing the deviation between the design database image and the physical mask. For example, a 1×1 kernel may be convolved across the reticle database images 402 to result in feature images 404, which may then be input to another convolutional layer to produce a set of feature images 406 that increase the number of images by applying multiple filters to each feature image 404. That is, more than one filter may be applied to each pixel of the counterbalanced images 404 to produce more feature images 406 than the input feature images 404.

In one general counterbalancing example, summing up the reticle database image and scaled |gradx(DB)| image has the effect of changing CD (critical dimension) of vertical line-space patterns. The |gradx(DB)| and |grady(DB)| may also be used to relax isometry (e.g., CD changes can differ in the x- and y-directions). This is done because the e-beam mask writers are not perfect, and the resulting mask can be slightly different from the design. For example, if the design has 100 nm CD, the physical mask could actually have 95 nm CD due to imperfections of the mask writer. This deviation is often called "mask bias." Thus, the 1st convolution layer may serve to counter-balance this mask bias. In practice, this layer is related to, but not equivalent, to learning the mask bias. In this example, this layer is configured to provide feature image(s) that assist the learning and, therefore, improve the resulting accuracy of the predicted near field reticle image.

The feature images 406 may then be input to a low pass filtering process followed by down-sampling the feature images 406 to a set of smaller sized feature images 408. For example the feature images 406 may have a 4× size, and the resulting feature images 408 have a 2× size. In general, the input images lack gray-scale and are almost binary (most pixels are either completely bright or completely dark), whereas the expected near field and far field images will be in fine gray-scale (as the expected ground truth images). Hence, higher resolution feature images (4×) with pixel size 55/4 nm square as input may be down-sampled throughout the CNN to achieve a final output is 1× with pixel size 55 nm square. This 1$^{st}$ down sampling layer may be configured to change the pixel size 55/4 nm square to 55/2 nm square (4× to 2×) by applying a low-pass filter from signal processing and then down-sampling. This is, different from average pooling, which is popular in the computer vision domain.

The next layers 422 of the CNN 400 may implement a sparse representation for a near field resolution. This neural network technique has been applied to image super-resolution in the above-referenced Chao Dong paper and FIG. 3. For instance, a set of 9×9 filters are each convolved across the feature images 408 to result in feature images 410. Since the 9×9 filters at this stage have a higher number than the input feature images 408, the output feature images 410 (or output channels) also have a higher number than the input feature images 408. The number of channels output by each layer may be selected to provide significant improvements in accuracy (i.e., more channels tend to result in higher accuracy) balanced with conserving processing resources and generalization. For example, a higher channel number may not be selected if it results in minimal improvement and increased processing, but a higher number of channels are selected if they result in significant accuracy improvements (even if increasing processing overhead). The filter number selection may be based on empirical results. The output feature images 410 may be smaller from using only the "valid" area, excluding halo area. The down-sampling layers of the CNN may contribute to the pixel size reduction to achieve the final 1× size as compared to the reticle database image size 4×.

The feature images 410 are then received by a nonlinear layer, which implements a dimensional reduction process, so as to output a set of feature images 412 having a smaller number (channels) than the input feature images 410. In this example, the filters of size 1×1 are convolved across the feature images 410 to output a reduced number of channels/feature images 412 having the same size as the input images.

A reconstruction layer as described above may then be applied to the feature images 412 to output a set of near field residual images 414. The output of the (nonlinear) dimensionality reduction layer may be referred to as "base images." For reconstruction of each of the real part and imaginary part of near field residual images, a 5×5 trainable filter may be applied to each base image; summing up all filtered base images; followed by the nonlinear activation function so as to output the near field residual (either real part or imaginary part). The filter size 5×5 is selected based on empirical results so as to achieve a predefined accuracy level although other sizes may be selected for other applications.

In practice, one CNN network may be used to predict 2 near field images for improved computational efficiency. In this example, the near field images are complex images, which can be represented by two real-valued feature images. The number of images may correspond to any number and type of images that are produced for different inspection tool settings. In the current example, both X and Y polarization simulated images may be produced by one CNN for use with X and Y polarization optical images acquired by the Teron 640e tool available from KLA-Tencor, Inc. of Milpitas, CA. Hence, in total there are 4 final reticle real-valued images forming two near field images. As shown, the near field residual images 414 may then be added to Kirchoff's field, a linear approximation of the near field, to produce a set of 4 predicted real-valued images 416 forming 2 near field images for two polarizations (X and Y polarizations).

Kirchhoff's field is generally a linear approximation to the near field, fast but inaccurate. To assist training, the CNN may initially predict near field residual images (the difference between the wanted near field and Kirchhoff's field). By summing the residuals with the Kirchhoff's field, the predicted near field images may then be obtained. In the illustrated example, the near field residual images 414 are added to Kirchhoff's field to form the 2× near field residual images 416, which are processed by a low pass filter, with the result down-sampled to generate predicted near field images 420 at 1X.

Regardless of the specific CNN configuration, the predicted near field images may be used to generate far field reticle images that are then used to train the CNN, as described with respect to FIG. 1. For example, the predicted near field image (NF) may then be input to physics-based simulation process 106 based on physics-based modeling parameters 108. In one implementation, a partially coherent model (PCM) is configured to generate the far field image by:

$$I_{model}(x,y) = \Sigma_{n=1}^{N} |NF \otimes \varphi_n|^2 \qquad \text{Equation [1]}$$

where x,y is the pixel index; NF is the complex near field of the mask; and $\varphi_1, \varphi_2, \ldots \varphi_n$ are physical parameters of the inspection tool.

The optimizer 110 receives the generated model image $I_{model}$ and the corresponding training image $I_{training}$ (112), which are screened in advance as being defect-free (via independent measurements). Any suitable optimization process, such as stochastic gradient descent (SGD), RMSProp, momentum, Adam, K-FAC, etc., may be used. The optimizer 110 may generally be configured to minimize the difference between such training images $I_{training}$ (112) and the simulated far field images $I_{model}$ by adjusting certain trainable parameters with respect to the deep learning model 104. In a specific implementation, a loss function, such as the sum of squares of the difference image as defined in the below Equation[2], may be minimized:

$$\Sigma_{t=1}^{\text{\# of training images}} \Sigma_{x,y} \|I_{model}^{(t)}(x,y) - I_{training}^{(t)}(x,y)\|_F^2 \qquad \text{Equation [2]}$$

In the above Equation [2], "$\| \|_F$" is the Frobenius norm. That is, the trainable parameters of the deep learning model are adjusted until the loss function, e.g., of Equation [2], is minimized, after which the deep learning model is deemed trained for the particular reticle. In the deep learning model, the parameters of the convolutional layers are adjustable trainable parameters, except for the low pass filter layers which have fixed parameters that are not trained. In specific embodiments, the deep learning model may be trained soon after the reticle is manufactured and qualified as defect-free prior to being used in a photolithography process. The training data may be selected and screened by an experienced engineer with the objective to have a sufficient coverage of defect-free patterns.

Figure 5:
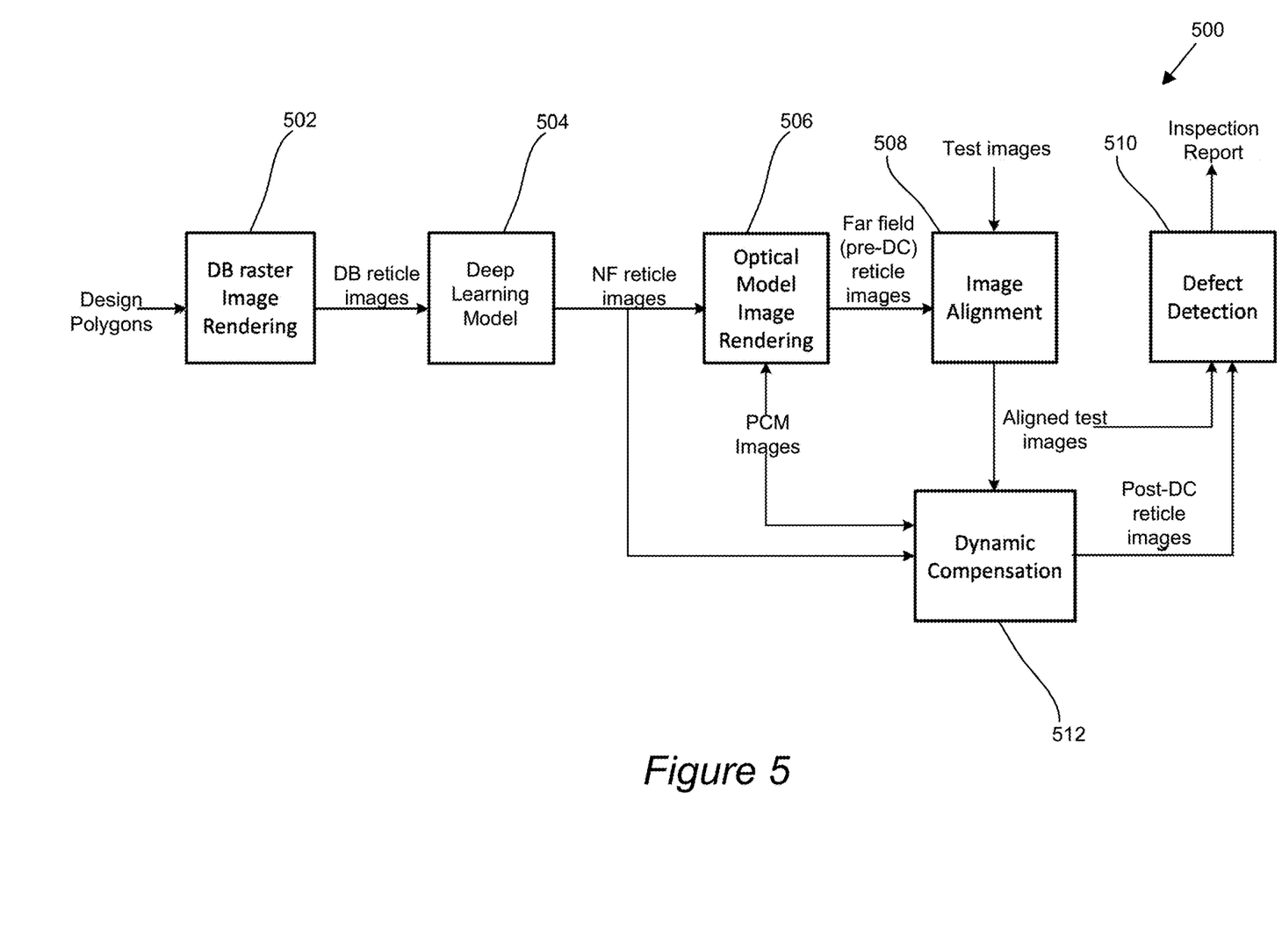
FIG. 5 illustrates a defect detection process in accordance with one embodiment of the present invention.

Once the deep learning model is trained for a particular reticle, it can then be used as part of the overall defect detection process, which includes image alignment against the translational offset, and a dynamic compensation (DC) mechanism to counterbalance the optical fluctuation and field dependency. FIG. 5 illustrates a defect detection process 500 in accordance with one embodiment of the present invention. For completeness, design database polygons may be initially received by a DB raster image rendering process 502 that generates reticle 4X database (DB) images, which are then received by deep learning process including a deep learning model 504, such as a trained CNN as described above, which outputs predicted near field images.

An optical model image rendering process 506 receives the near field reticle images and is configured to produce far field images. An image alignment process 508 is configured to align the test images acquired from the inspection tool to the rendered far field image. To be specific, the test images are moved relative to the far field images until there are minimal differences between the two sets of images.

Test images are obtained from the inspection area of a reticle. Moreover, an EUV inspection tool may be operable to detect and collect reflected light images of multiple polarizations as an incident optical beam scans across each patch of the reticle. In non-EUV reticle inspectors, transmitted light (and/or reflected light) may be utilized and the techniques described herein may be configured for such inspectors. An incident optical beam may scan across reticle swaths that each comprises a plurality of patches. Light is collected in response to this incident beam from a plurality of points or subareas of each patch.

The inspection tool may be generally operable to convert such detected light into detected signals corresponding to intensity values. The detected signals may take the form of an electromagnetic waveform having amplitude values that correspond to different intensity values at different locations of the reticle. The detected signals may also take the form of a simple list of intensity values and associated reticle point coordinates. The detected signals may also take the form of an image having different intensity values corresponding to different positions or scan points on the reticle. A reticle image may be generated after all the positions of the reticle are scanned and light is detected, or portions of a reticle image may be generated as each reticle portion is scanned. In general, the test images from particular patches of a reticle may be generated by the inspection tool.

In certain embodiments, a dynamic compensation (DC) process 512 may also be implemented on the far field images produced by the optical model image rendering process 506 with the aligned test images. The dynamic compensation process may be configured to counterbalance certain tool variations, such as focus fluctuations and field dependent variation, so as to produce dynamically compensated (DC) reticle images. The far field images before and after dynamic compensation (DC) are called pre-DC and post-DC images, respectively.

In this example, the pre-DC image may be defined by:

$$I_{model} = \Sigma_{n=1}^{N} \lambda_n |NF \otimes \varphi_n|^2 \qquad \text{Equation [3]}$$

where NF is the complex near field of the mask; the eigen-pairs $(\lambda_2, \varphi_2), (\lambda_2, \varphi_2), \ldots, (\lambda_2, \varphi_2)$ are physical parameters of the inspection tool.

The dynamic compensation may then comprise minimization of another loss function. For instance, the linear least squares is:

$$\min_{\lambda_1, \lambda_2, \ldots, \lambda_n} \|I_{test} - I_{model}\|_F^2$$

where the image $I_{model}$ formed with the minimizer $\lambda_1, \lambda_2, \ldots \lambda_n$, rather than the original eigenvalues is called the post-DC image.

Defect detection (510) may then be performed by comparing the post-DC reticle images to the test images and then an inspection report is obtained. The differences can then be reviewed, e.g., by a defect classification process or high-resolution tool. For instance, a SEM may be used to review the defective area to determine whether critical dimensions (CD's) are out of specification. The review may include separating the nuisance defects from the "real" defects that will likely impact the function of the devices on the final wafer produced with such reticle. By way of example, certain reticle nuisance defects may be determined to not likely result in printed defects on the wafer, while others may result in printed defects that do impact the device function.

An out-of-specification CD (or other defect) may result in the reticle not passing the inspection. If the reticle fails inspection, the reticle may be discarded or repaired if possible. For instance, certain defects can be cleaned from the reticle. After repair or cleaning, a new inspection may be performed on the repaired or cleaned reticle and the procedure repeated. Alternatively, the reticle fabrication process or reticle design may be adjusted, and a new reticle is fabricated.

In general, the absorber and multilayer materials of an EUV reticle form pattern structures that are designed and formed with critical dimension (CD) widths. A particular CD value may generally affect how a particular reticle feature is transferred to the wafer in the photolithography process, and such CD is chosen to optimize this transfer process. Said in another way, if a certain reticle feature's CD value is within a specified CD range, such CD value will result in fabrication of a corresponding wafer feature that allows proper operation of the resulting integrated circuit, as intended by the circuit designer. Features are typically formed with minimum dimensions that also result in operational circuits so as to conserve integrated chip area.

A newly fabricated reticle may include CD (or other film or pattern characteristic) defect issues. For example, the reticle may have defective CD regions. A reticle may become damaged over time in a number of different ways. Some types of CD degradation may be caused by chemical reactions between the reticle features (MoSi) and the exposure light, cleaning processes, contamination, etc. These physical effects can also adversely affect the critical dimensions (CD's) of the reticle over time.

As a result of this degradation, the feature CD values may have significantly changed so as to affect CD uniformity across the reticle and adversely affect wafer yield. For instance, mask feature widths in portions of the mask may be significantly larger than the original line width CD. For instance, there may be a radial pattern of CD non-uniformity, with the center of the reticle having different CD than the edges of the reticle.

A Critical-Dimension-Uniformity (CDU) map of a reticle may be generated in order to facilitate monitoring of CD in such reticle. These CDU maps may be important for a semiconductor chip maker to understand the process window that will result from the use of the reticle. A CDU map may allow a chip maker to determine whether to use the reticle, apply compensation for the errors in the lithography process, or improve fabrication of a reticle so as to form an improved next reticle.

A CDU map may be generated using various techniques. In a die-to-database inspection approach, the average intensity values between corresponding areas of the test and reference images may be compared to obtain a delta intensity value. The delta-intensity values across the reticle can then effectively form a delta-intensity map, which can then be calibrated to a full CDU map. Although the inspection techniques are described as being based on intensity type signals, other types of signals may be used in alternative embodiments of the present invention.

Certain embodiments of the present invention provide apparatus and techniques for significantly improving the EUV photomask defect sensitivity of the DUV inspection tools by providing an efficiently and accurately rendered reference reticle image from the design database. By way of comparison, the deep learning technique for generating an accurate near field image combined with a physics-based modelling process for generating a far field reticle image can be accomplished in less than 90 minutes, while using a physic-based rigorous simulation approach to generate a near field image would take years. Results obtained with the combination deep learning and physics-based modelling have been found to have significantly improved accuracy in terms of the difference between the final modelled reticle image and the defect-free image, as compared to other techniques. To reduce the effect of shot noise, a 2×2 convolution filter of all ones may be applied and the maximum difference in magnitude may be measured for estimating the model error. In an example of a 2K by 1K patch image with 2D patterns, the maximum convoluted difference between the pre-DC image and test image is 51 gray scales with a deep learning approach, whereas the maximum convoluted difference is 109 gray scales with a conventional approach. For the same patch image, maximum 88 gray-scale convoluted difference between the post-DC image and test image was found with a deep learning approach versus 40 convoluted difference with conventional approach. Ideally, a deep learning process for generating the near field reticle image is independent of the inspection tool.

Figure 6:
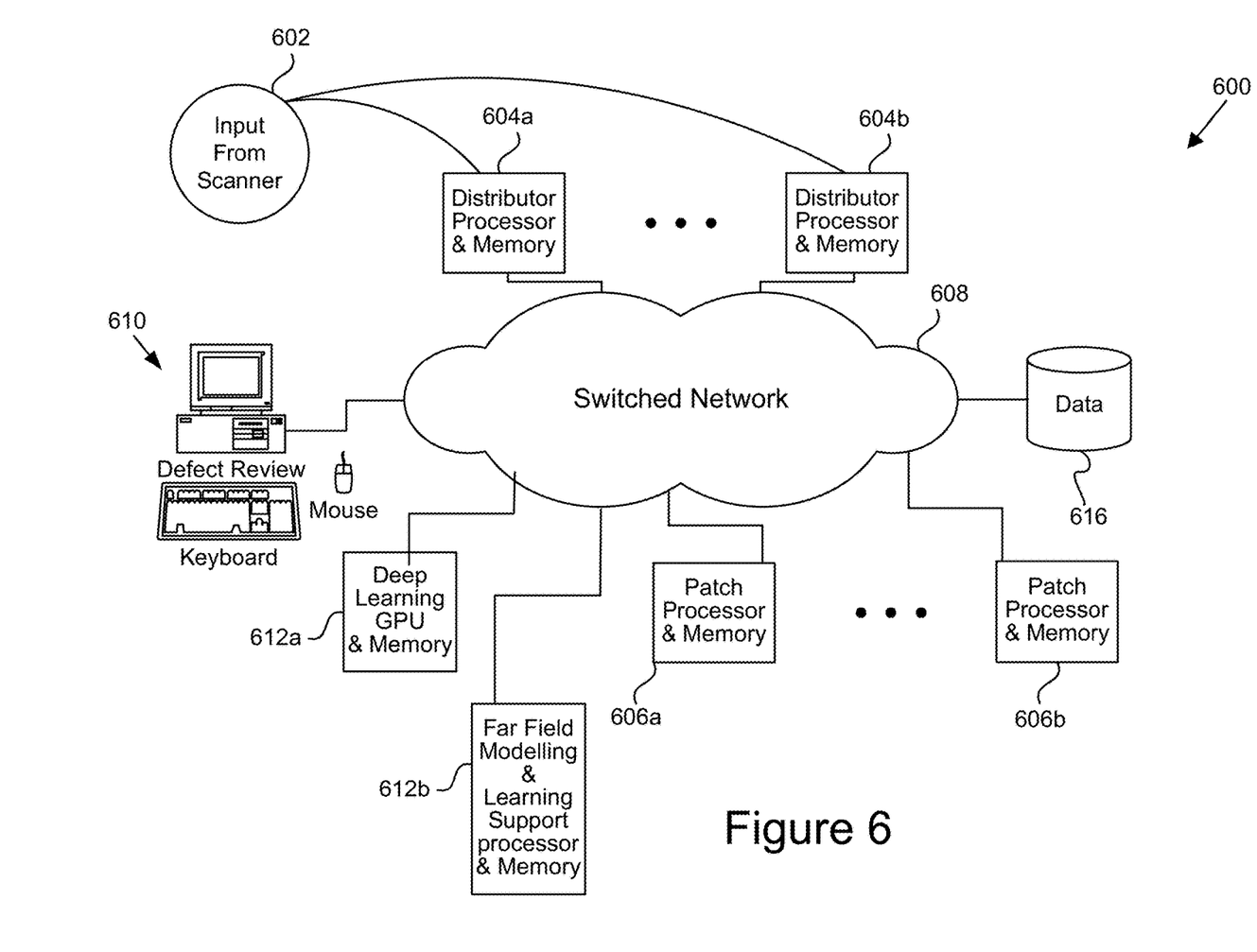
FIG. 6 is a diagrammatic representation of an example inspection system in which techniques of the present invention may be implemented.

Techniques of the present invention may be implemented in any suitable combination of hardware and/or software. FIG. 6 is a diagrammatic representation of an example inspection system 600 in which techniques of the present invention may be implemented. The inspection system 600 may receive input 602 from an inspection tool or scanner (not shown). The inspection system may also include a data distribution system (e.g., 604a and 604b) for distributing the received input 602, an intensity signal (or patch) processing system (e.g., patch processors and memory 606a and 606b) for processing specific portions/patches of received input 602, a deep learning system (e.g., Deep Learning GPU and Memory 612a) for learning near field reticle images, a far field modeling and learning support system (e.g., Far Field Modelling and Learning Support Processor and Memory 612b), a network (e.g., switched network 608) for allowing communication between the inspection system components, an optional mass storage device 616, and one or more inspection control and/or review stations (e.g., 610) for reviewing the maps. Each processor of the inspection system 600 typically may include one or more microprocessor integrated circuits and may also contain interface and/or memory integrated circuits and may additionally be coupled to one or more shared and/or global memory devices. In a specific implementation, the deep learning model (e.g., CNN) is implemented on a graphics processing unit (GPU) for increased speed and processing power for the training process, while the other processes for generating a post-DC or pre-DC reticle images (physics-based modeling, training optimization, dynamic compensation, etc.) are implemented by one or more CPU's and memory.

The scanner or data acquisition system (not shown) for generating input data 602 may take the form of any suitable instrument (e.g., as described further herein) for obtaining intensity signals or images of a reticle. For example, the scanner may construct an optical image or generate intensity values of a portion of the reticle based on a portion of detected light that is reflected, transmitted, or otherwise directed to one or more light sensors. The scanner may then output the intensity values or image may be output from the scanner.

The reticle is generally divided into a plurality of patch portions from which multiple intensity values from multiple points are obtained. The patch portions of the reticle can be scanned to obtain this intensity data. The patch portions may be any size and shape, depending on the particular system and application requirements. In general, multiple intensity values for each patch portion may be obtained by scanning the reticle in any suitable manner. By way of example, multiple intensity values for each patch portion may be obtained by raster scanning the reticle. Alternatively, the images may be obtained by scanning the reticle with any suitable pattern, such as a circular or spiral pattern. Of course, the sensors may have to be arranged differently (e.g., in a circular pattern) and/or the reticle may be moved differently (e.g., rotated) during scanning in order to scan a circular or spiral shape from the reticle.

In the example illustrated below, as the reticle moves past the sensors, light is detected from a rectangular region (herein referred to as a "swath") of the reticle and such detected light is converted into multiple intensity values at multiple points in each patch. In this embodiment, the sensors of the scanner are arranged in a rectangular pattern to receive light that is reflected and/or transmitted from the reticle and generate therefrom a set of intensity data that corresponds to a swath of patches of the reticle. In a specific example, each swath can be about 1 to 2 million pixels wide and about 1000 to 2000 pixels high, while each patch can be about 2000 pixels wide and 1000 pixels high.

Intensity values for each patch may be obtained using an optical inspection tool that is set up in any suitable manner. The optical tool is generally set up with a set of operating parameters or a "recipe" that is substantially the same for the different inspection runs for obtaining intensity values. Recipe settings may include one or more of the following settings: a setting for scanning the reticle in a particular pattern, pixel size, a setting for grouping adjacent signals from single signals, a focus setting, polarization setting, an illumination or detection aperture setting, an incident beam angle and wavelength setting, a detector setting, a setting for the amount of reflected or transmitted light, aerial modeling parameters, etc.

Intensity or image data 602 can be received by data distribution system via network 608. The data distribution system may be associated with one or more memory devices, such as RAM buffers, for holding at least a portion of the received data 602. Preferably, the total memory is large enough to hold an entire swatch of data. For example, one gigabyte of memory works well for a swatch that is 1 million by 1000 pixels or points per setting of polarization and focus.

The data distribution system (e.g., 604a and 604b) may also control distribution of portions of the received input data 602 to the patch processors (e.g. 606a and 606b). For example, data distribution system may route data for a first patch to a first patch processor 606a, and may route data for a second patch to patch processor 606b. Multiple sets of data for multiple patches may also be routed to each patch processor. The distribution system may also control distribution of portion of the modeled pre-DC or post-DC reticle images ("reference reticle images") to the patch processors (e.g., 606a and 606b).

The patch processors may receive intensity values or an image that corresponds to at least a portion or patch of the reticle. The patch processors may each also be coupled to or integrated with one or more memory devices (not shown), such as DRAM devices that provide local memory functions, such as holding the received data portion. Preferably, the memory is large enough to hold data that corresponds to a patch of the reticle. For example, eight megabytes of memory works well for intensity values or an image corresponding to a patch that is 512 by 1024 pixels. The patch processors may also share memory.

Each set of input data 602 may correspond to a swath of the reticle. One or more sets of data may be stored in memory of the data distribution system. This memory may be controlled by one or more processors within the data distribution system, and the memory may be divided into a plurality of partitions. For example, the data distribution system may receive data corresponding to a portion of a swath into a first memory partition (not shown), and the data distribution system may receive another data corresponding to another swath into a second memory partition (not shown). Preferably, each of the memory partitions of the data distribution system only holds the portions of the data that are to be routed to a processor associated with such memory partition. For example, the first memory partition of the data distribution system may hold and route first data to patch processor 606a, and the second memory partition may hold and route second data to patch processor 606b.

The incident light or detected light may be passed through any suitable spatial aperture to produce any incident or detected light profile at any suitable incident angles. By way of examples, programmable illumination or detection apertures may be utilized to produce a particular beam profile, such as dipole, quadrapole, quasar, annulus, etc. In a specific example, Source Mask Optimization (SMO) or any pixelated illumination technique may be implemented.

The data distribution system may define and distribute each set of data of the data based on any suitable parameters of the data. For example, the data may be defined and distributed based on the corresponding position of the patch on the reticle. In one embodiment, each swath is associated with a range of column positions that correspond to horizontal positions of pixels within the swath. For example, columns 0 through 256 of the swath may correspond to a first patch, and the pixels within these columns will comprise the first image or set of intensity values, which is routed to one or more patch processors. Likewise, columns 257 through 512 of the swath may correspond to a second patch, and the pixels in these columns will comprise the second image or set of intensity values, which is routed to different patch processor(s).

Figure 7:
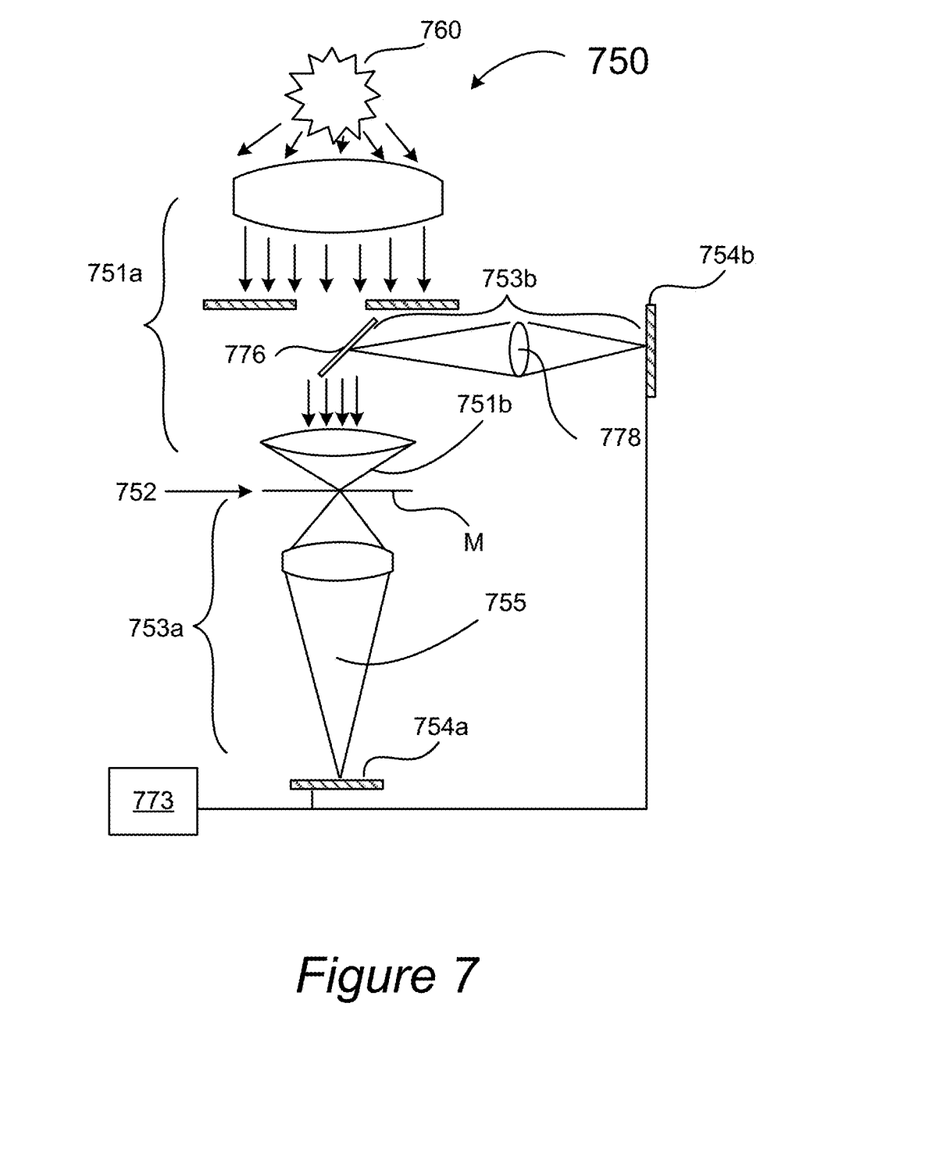
FIG. 7 provides a schematic representation of a photomask inspection apparatus in accordance with certain embodiments.

FIG. 7 provides a schematic representation of an example inspection system 750 that has illumination optics 751a includes an imaging lens with a relative large numerical aperture 751b at a reticle plane 752 in accordance with certain embodiments. The depicted inspection system 750 includes detection optics 753a and 753b, including microscopic magnification optics designed to provide, for example, 60-200× magnification or more for enhanced inspection. For example, the numerical aperture 751b at the reticle plane 752 of the inspection system may be considerable greater than the numerical aperture 701 at the reticle plane of the lithography system, which would result in differences between test inspection images and actual printed images. Although the illustrated inspector includes both reflected and transmitted light components (for inspection of non-EUV reticles), an EUV reticle inspection would only utilize reflected light.

The inspection techniques described herein may be implemented on various specially configured inspection systems, such as the one schematically illustrated in FIG. 7. The illustrated system 750 includes an illumination source 760 producing a light beam that is directed through illumination optics 751a onto a photomask M in the reticle plane 752. Examples of light sources include lasers or filtered lamps. In one example, the source is a 193 nm laser. As explained above, the inspection system 750 may have a numerical aperture 751b at the reticle plane 752 that may be greater than a reticle plane numerical aperture of the corresponding lithography system. The photomask M to be inspected is placed on a mask stage at the reticle plane 752 and exposed to the source.

The patterned image from the mask M is directed through a collection of optical elements 753a, which project the patterned image onto a sensor 754a. In a reflecting system, optical elements (e.g., beam splitter 776 and detection lens 778) direct and capture the reflected light onto sensor 754b. Suitable sensors include charged coupled devices (CCD), CCD arrays, time delay integration (TDI) sensors, TDI sensor arrays, photomultiplier tubes (PMT), and other sensors.

The illumination optics column may be moved respect to the mask stage and/or the stage moved relative to a detector or camera by any suitable mechanism so as to scan patches of the reticle. For example, a motor mechanism may be utilized to move the stage. The motor mechanism may be formed from a screw drive and stepper motor, linear drive with feedback position, or band actuator and stepper motor, by way of examples.

The signals captured by each sensor (e.g., 754a and/or 754b) can be processed by a computer system 773 or, more generally, by one or more signal processing devices, which may each include an analog-to-digital converter configured to convert analog signals from each sensor into digital signals for processing. The computer system 773 typically has one or more processors coupled to input/output ports, and one or more memories via appropriate buses or other communication mechanisms.

The computer system 773 may also include one or more input devices (e.g., a keyboard, mouse, joystick) for providing user input, such as changing focus and other inspection recipe parameters. The computer system 773 may also be connected to the stage for controlling, for example, a sample position (e.g., focusing and scanning) and connected to other inspection system components for controlling other inspection parameters and configurations of such inspection system components.

The computer system 773 may be configured (e.g., with programming instructions) to provide a user interface (e.g., a computer screen) for displaying resultant intensity values, images, and other inspection results. The computer system 773 may be configured to analyze intensity changes, phase, and/or other characteristics of reflected and/or transmitted sensed light beam. The computer system 773 may be configured (e.g., with programming instructions) to provide a user interface (e.g., on a computer screen) for displaying resultant intensity values, images, and other inspection characteristics. In certain embodiments, the computer system 773 is configured to carry out inspection techniques detailed above.

Because such information and program instructions may be implemented on a specially configured computer system, such a system includes program instructions/computer code for performing various operations described herein that can be stored on a computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In certain embodiments, a system for inspecting a photomask includes at least one memory and at least one processor that are configured to perform techniques described herein. One example of an inspection system includes a specially configured TeraScan™ DUV inspection system available from KLA-Tencor of Milpitas, California.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method of inspecting a photolithographic reticle, the method comprising:
simulating a plurality of reference far field images by inputting a plurality of reference near field images into a physics-based model, wherein the plurality of reference near field images are generated by a trained deep learning model from a test portion of a design database that was used to fabricate a test area of a test reticle; and
inspecting the test area of a test reticle, which was fabricated from the design database, for defects via a die-to-database process that includes comparing the plurality of reference far field reticle images simulated by the physics-based model to a plurality of test images acquired by an inspection system from the test area of the test reticle.

2. The method of claim 1, wherein the deep learning model was trained by (i) inputting a plurality of reticle database images produced from a training portion of a design database into the deep learning model to generate a plurality of near field reticle images, (ii) receiving the plurality of near field images into the physics-based model to simulate a plurality of corresponding far field reticle images at an image plane of an inspection system via a physics-based process, (iii) providing a plurality of corresponding training reticle images that were acquired by imaging a portion of a training reticle fabricated from the training portion of the design database and such training reticle images are selected for pattern variety and are defect-free, (iv) training the deep learning model by adjusting a plurality of parameters of the deep learning model and repeating the operation of inputting the plurality of reticle database images into the deep learning model with its adjusted parameters to generate a plurality of adjusted near field images that are received by the physics-based model to simulate a next plurality of far field images until differences between the next far field reticle images and the plurality of corresponding training reticle images are minimized.

3. The method of claim 2, wherein the physics-based process is based on a Hopkins method for producing each far field reticle image on an image plane of the inspection system based on each corresponding near field image, wherein the deep learning model was trained as a convolutional neural network (CNN) that does not incorporate reticle image formation onto the image plane and includes mapping each reticle database image to a near field image that would be generated by light interacting with a reticle that was fabricated with the design database.

4. The method of claim 3, wherein the CNN excludes simulating perturbations in each far field image caused by field-dependent changes in the inspection system and is independent of the inspection system.

5. The method of claim 3, wherein the adjusted plurality of parameters of the deep learning model include weights and/or bias values of a plurality of layers of the deep learning model, wherein the deep learning model was trained without adjusting any parameters of the physics-based model.

6. The method of claim 5, wherein the layers, in which adjusting occurs, comprise convolutional layers with non-linear activations.

7. The method of claim 6, wherein the deep learning model was trained without adjusting parameters in one or more low pass filtering layers for down sampling operations.

8. The method of claim 3, wherein the CNN includes one or more convolutional layers for counterbalancing deviations between each reticle database image and a physical reticle portion produced by such reticle database image, one or more layers for producing a plurality of down sampled images, and one or more layers for implementing a sparse representation for near field resolution.

9. The method of claim 1, further comprising:
aligning the test images with the reference images; and
applying a dynamic compensation process to the reference images with respect to the test images to counterbalance variations, including focus fluctuations and/or field dependent variations, in the inspection system.

10. An inspection system for inspecting a photolithographic reticle, the system comprising at least one memory and at least one processor that are configured to perform the following operations:
simulating a plurality of reference far field images by inputting a plurality of reference near field images into a physics-based model, wherein the plurality of reference near field images are generated by a trained deep learning model from a test portion of a design database that was used to fabricate a test area of a test reticle; and
inspecting the test area of a test reticle, which was fabricated from the design database, for defects via a die-to-database process that includes comparing the plurality of reference far field reticle images simulated by the physics-based model to a plurality of test images acquired by an inspection system from the test area of the test reticle.

11. The system of claim 10, wherein the deep learning model was trained by (i) inputting a plurality of reticle database images produced from a training portion of a design database into the deep learning model to generate a plurality of near field reticle images, (ii) receiving the plurality of near field images into the physics-based model to simulate a plurality of corresponding far field reticle images at an image plane of an inspection system via a physics-based process, (iii) providing a plurality of corresponding training reticle images that were acquired by imaging a portion of a training reticle fabricated from the training portion of the design database and such training reticle images are selected for pattern variety and are defect-free, (iv) training the deep learning model by adjusting a plurality of parameters of the deep learning model and repeating the operation of inputting the plurality of reticle database images into the deep learning model with its adjusted parameters to generate a plurality of adjusted near field images that are received by the physics-based model to simulate a next plurality of far field images until differences between the next far field reticle images and the plurality of corresponding training reticle images are minimized.

12. The system of claim 11, wherein a physics-based process is based on a Hopkins method for producing each far field reticle image on an image plane of the inspection system based on each corresponding near field image, wherein the deep learning model was trained as a convolutional neural network (CNN) that does not incorporate reticle image formation onto the image plane and includes mapping each reticle database image to a near field image that would be generated by light interacting with a reticle that was fabricated with the design database.

13. The system of claim 12, wherein the CNN excludes simulating perturbations in each far field reticle image caused by field-dependent changes in the inspection system and is independent of the inspection system.

14. The system of claim 12, wherein the adjusted plurality of parameters of the deep learning model include weights and/or bias values of a plurality of layers of the deep learning model, wherein the deep learning model was trained without adjusting any parameters of the physics-based model.

15. The system of claim 14, wherein the layers, in which adjusting occurs, comprise convolutional layers with non-linear activations.

16. The system of claim 15, wherein the deep learning model was trained without adjusting parameters in one or more low pass filtering layers for down sampling operations.

17. The system of claim 12, wherein the CNN includes one or more convolutional layers for counterbalancing deviations between each reticle database image and a physical reticle portion produced by such reticle database image, one or more layers for producing a plurality of down sampled images, and one or more layers for implementing a sparse representation for near field resolution.

18. The system of claim 10, wherein the at least one memory and at least one processor are further configured for:
aligning the test images with the reference images; and
applying a dynamic compensation process to the reference images with respect to the test images to counterbalance variations, including focus fluctuations and/or field dependent variations, in the inspection system.

19. A non-transitory computer readable medium having instruction stored thereon for performing the following operations:
simulating a plurality of reference far field images by inputting a plurality of reference near field images into a physics-based model, wherein the plurality of reference near field images are generated by a trained deep learning model from a test portion of a design database that was used to fabricate a test area of a test reticle; and
inspecting the test area of a test reticle, which was fabricated from the design database, for defects via a die-to-database process that includes comparing the plurality of reference far field reticle images simulated by the physics-based model to a plurality of test images acquired by an inspection system from the test area of the test reticle.

* * * * *